(12) United States Patent
Benny et al.

(10) Patent No.: US 8,272,664 B2
(45) Date of Patent: Sep. 25, 2012

(54) AIRBAG LATERAL FLAP

(75) Inventors: Jesse Benny, Auburn Hills, MI (US);
Michael Lachat, Shelby Township, MI (US); Anna Libby, Lake Orion, MI (US); Bobby Lusk, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 11/956,101

(22) Filed: Dec. 13, 2007

(65) Prior Publication Data

US 2009/0152842 A1    Jun. 18, 2009

(51) Int. Cl.
*B60R 21/201*    (2011.01)
(52) U.S. Cl. .................. 280/728.1; 280/743.1
(58) Field of Classification Search ............ 280/728.3, 280/730.1, 732, 733, 739, 743.2, 743.1, 740
See application file for complete search history.

(56) References Cited

U.S. PATENT DOCUMENTS

| | | | |
|---|---|---|---|
| 4,842,300 A | 6/1989 | Ziomek et al. | |
| 5,346,248 A | 9/1994 | Rhein et al. | |
| 5,407,227 A | 4/1995 | Lauritzen et al. | |
| 5,447,329 A | 9/1995 | Hamada | |
| 5,452,913 A | 9/1995 | Hansen et al. | |
| 5,492,363 A * | 2/1996 | Hartmeyer et al. | 280/739 |
| 5,588,674 A | 12/1996 | Yoshimura et al. | |
| 5,613,698 A | 3/1997 | Patercsak et al. | |
| 5,630,614 A | 5/1997 | Conlee et al. | |
| 5,755,459 A | 5/1998 | LaLonde | |
| 5,765,867 A * | 6/1998 | French | 280/743.2 |
| 5,772,239 A | 6/1998 | Seymour | |
| 5,823,566 A | 10/1998 | Manire | |
| 6,056,318 A * | 5/2000 | Braunschadel | 280/739 |
| 6,070,904 A * | 6/2000 | Ozaki et al. | 280/743.1 |
| 6,131,944 A * | 10/2000 | Henkel et al. | 280/728.3 |
| 6,206,409 B1 * | 3/2001 | Kato et al. | 280/728.2 |
| 6,371,510 B1 * | 4/2002 | Marriott et al. | 280/730.1 |
| 6,474,686 B1 * | 11/2002 | Higuchi et al. | 280/743.1 |
| 6,669,229 B2 | 12/2003 | Thomas | |
| 6,682,093 B2 | 1/2004 | Tajima et al. | |
| 6,874,810 B2 | 4/2005 | Soderquist | |
| 6,877,772 B2 | 4/2005 | Fischer et al. | |
| 6,883,381 B2 | 4/2005 | Kolb et al. | |
| 6,883,831 B2 * | 4/2005 | Hawthorn et al. | 280/739 |

(Continued)

FOREIGN PATENT DOCUMENTS

JP    2005343267 A    12/2007

(Continued)

OTHER PUBLICATIONS

International Search Report from International Application No. PCT/US08/52201 dated Aug. 1, 2008.

(Continued)

*Primary Examiner* — Joseph Rocca
*Assistant Examiner* — Karen A Beck
(74) *Attorney, Agent, or Firm* — Sally J. Brown; Stoel Rives LLP

(57) ABSTRACT

The airbag assembly features an airbag cushion, a deployment flap, an extension flap attached to the deployment flap, and a lateral flap. The deployment flap is configured to protect the airbag cushion as it deploys from the module housing. The extension flap is configured to position the airbag cushion during deployment. The lateral flap is configured to allow for proper airbag deployment.

16 Claims, 7 Drawing Sheets

U.S. PATENT DOCUMENTS

| | | | |
|---|---|---|---|
| 6,942,242 B2 | 9/2005 | Hawthorn et al. | |
| 6,955,377 B2* | 10/2005 | Cooper et al. | 280/743.1 |
| 6,971,671 B2* | 12/2005 | Schneider et al. | 280/739 |
| 7,083,191 B2 | 8/2006 | Fischer | |
| 7,314,228 B2* | 1/2008 | Ishiguro et al. | 280/728.2 |
| 7,396,044 B2* | 7/2008 | Bauer et al. | 280/743.2 |
| 7,597,355 B2* | 10/2009 | Williams et al. | 280/739 |
| 7,631,894 B2* | 12/2009 | Hasebe et al. | 280/743.2 |
| 7,712,781 B2* | 5/2010 | Klinkenberger et al. | 280/743.1 |
| 7,731,230 B2* | 6/2010 | Fischer et al. | 280/732 |
| 7,770,925 B2 | 8/2010 | Seymour et al. | |
| 7,878,539 B2* | 2/2011 | Maripudi et al. | 280/740 |
| 2002/0020990 A1 | 2/2002 | Sinnhuber et al. | |
| 2003/0189319 A1* | 10/2003 | Soderquist | 280/728.3 |
| 2003/0234520 A1 | 12/2003 | Hawthorn et al. | |
| 2006/0071459 A1* | 4/2006 | Hayakawa et al. | 280/730.1 |
| 2007/0057487 A1 | 3/2007 | Kim | |
| 2007/0120346 A1* | 5/2007 | Kwon | 280/728.2 |
| 2007/0126219 A1* | 6/2007 | Williams | 280/739 |
| 2007/0138779 A1 | 6/2007 | Kwon | |
| 2007/0170710 A1* | 7/2007 | Bouquier | 280/739 |
| 2007/0278772 A1* | 12/2007 | Burghardt et al. | 280/731 |
| 2008/0023950 A1* | 1/2008 | Kalczynski et al. | 280/739 |
| 2008/0217887 A1* | 9/2008 | Seymour et al. | 280/728.2 |
| 2008/0217892 A1* | 9/2008 | Maripudi et al. | 280/740 |
| 2009/0039630 A1* | 2/2009 | Schneider et al. | 280/740 |
| 2009/0152842 A1* | 6/2009 | Benny et al. | 280/728.3 |
| 2011/0121548 A1* | 5/2011 | Maripudi et al. | 280/740 |

FOREIGN PATENT DOCUMENTS

| | | |
|---|---|---|
| WO | WO 2008/109202 | 9/2008 |

OTHER PUBLICATIONS

Co-pending U.S. Appl. No. 12/580,488.
Office Action ((Election/Restriction) issued Dec. 9, 2008 in co-pending U.S. Appl. No. 11/714,349.
Response to Election Species filed Feb. 9, 2009 in co-pending U.S. Appl. No. 11/714,349.
Office Action issued Jun. 11, 2009 in co-pending U.S. Appl. No. 11/714,349.
Response to Office Action filed Dec. 11, 2009 in co-pending U.S. Appl. No. 11/714,349.
Examiner's Amendment issued with Notice of Allowance Mar. 2, 2010 in co-pending U.S. Appl. No. 11/714,349.
Request for Continued Examination filed Mar. 11, 2010 in co-pending U.S. Appl. No. 11/714,349, now issued as U.S. Patent No. 7,770,925.
Notice of Allowance issued Apr. 8, 2010 in co-pending U.S. Appl. No. 11/714,349, now issued as U.S. Patent No. 7,770,925.

* cited by examiner

AIRBAG LATERAL FLAP

TECHNICAL FIELD

The present disclosure relates generally to the field of automotive protective systems. More specifically, the present disclosure relates to airbag deployment systems for preventing damage to the airbag cushion and positioning the airbag cushion during deployment.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

Figure 1:
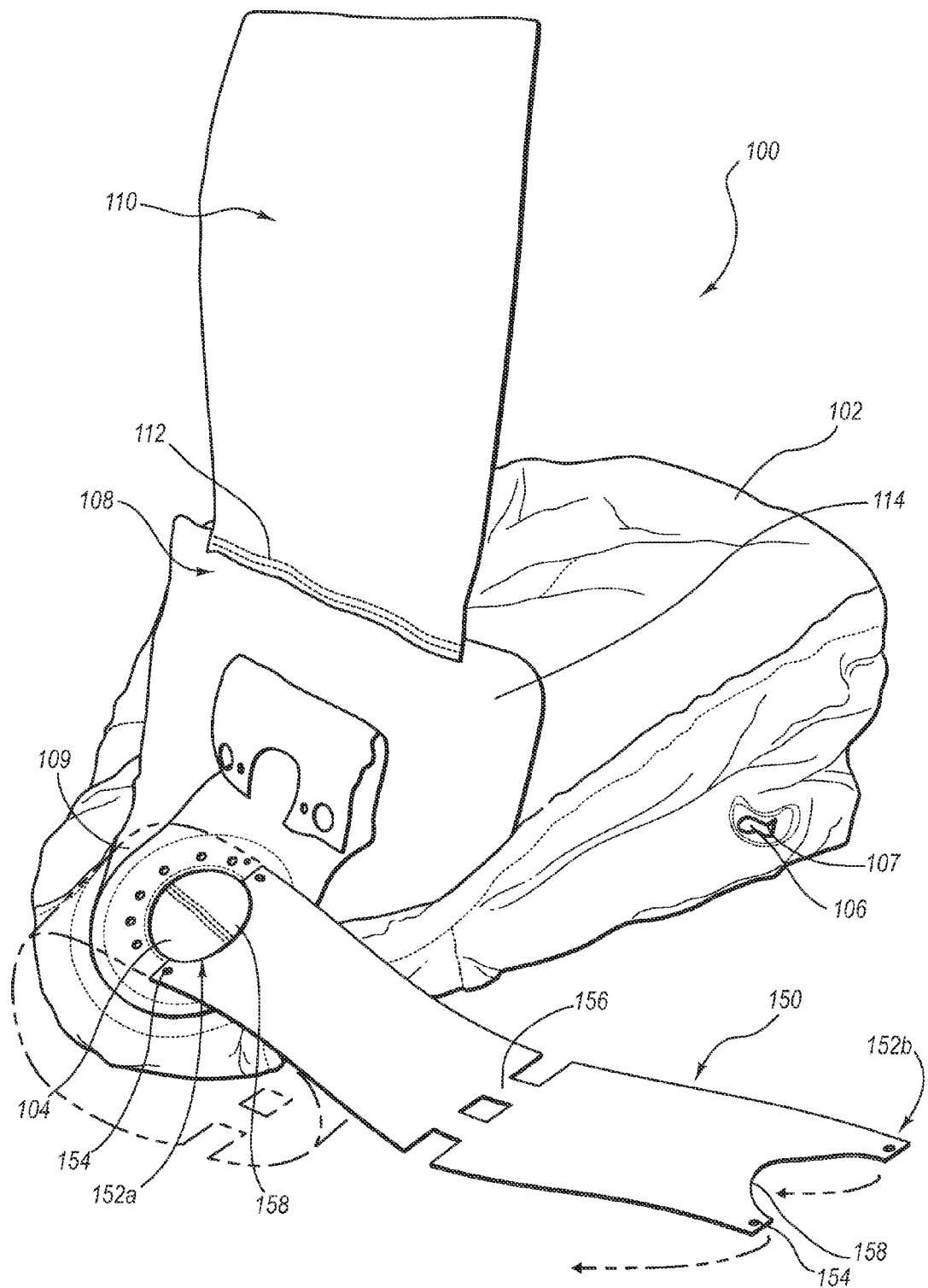
FIG. 1 is a perspective view of one embodiment of an inflatable airbag cushion having a lateral flap, deployment flap, and an extension flap coupled to the deployment flap.

INDEX OF ELEMENTS IDENTIFIED IN THE DRAWINGS 10 vehicle
12 instrument panel
14 passenger compartment
16 car seat
18 passenger seat
100 airbag assembly
102 airbag cushion
104 gas-introducing throat
106 closeable vent
108 deployment flap
109 first end of deployment flap
110 extension flap
111 free end of extension flap
112 stitching
113 middle portion of extension flap
114 second end of deployment flap
150 lateral flap
152a end of lateral flap
152b end of lateral flap
154 mounting holes
156 tear seam
158 semicircular cutout
300 airbag module
302 airbag cushion
308 deployment flap
310 extension flap
312 stitching
320 housing
322 airbag cover
324 airbag cover tear seam
326 inflator
350 lateral flap
352 end of lateral flap
354 holes for mounting
356 lateral flap tear seam
358 semicircular cutout
400 airbag module
402 airbag cushion
408 deployment flap
410 extension flap
411 free end of extension flap
414 second end of deployment flap
420 housing
422 airbag cover
430 first end of extension flap
434 distal end of inflatable airbag cushion
450 lateral flap
456 tear seam
500 airbag assembly
502 airbag cushion
506 aperture of closeable vent
507 membrane of closeable vent
508 deployment flap
510 extension flap
511 free end of extension flap
520 housing
522 airbag cover
526 inflator
540 closeable vent
542 tether
550 lateral flap
556 tear seam

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Airbag cushions that are located in an instrument panel or steering wheel typically deploy directly in front of an occupant. These are commonly referred to as frontal airbag systems. During a collision, the airbag cushion inflates and deploys through a cosmetic cover. The airbag cushion deploys towards the occupant and provides restraint. Conventionally, airbag deployment may be problematic when an occupant is out of position, such as being positioned too closely to the airbag or when an object is considered out of position, such as a rear-facing infant car seat in the passenger seat of a vehicle.

Additionally, as a frontal airbag deploys out of its module housing within the instrument panel, the edges of the cover may be rough. Rough edges in the cover may rub against the airbag cushion as it deploys, possibly causing tearing, holes or snags in the airbag cushion.

Accordingly, airbag assemblies of the present disclosure are provided to protect an airbag cushion from ripping, tearing, or snagging during deployment. Airbag assemblies of the present disclosure also are provided to position the airbag around potential out of position objects such as an infant car seat or out of position occupants in a manner that does not delay the time required for full airbag deployment if an out of position object is not encountered. Thus, the airbag assemblies of the present disclosure may not deploy in an anomalous condition.

FIG. 1 depicts one embodiment of an airbag assembly 100 as shown from a perspective view. Airbag assembly 100 comprises an inflatable airbag cushion 102 constructed of a fabric material. Airbag cushion 102 includes a gas-introducing throat 104 for receiving inflation gas from an inflator (not shown), such as a pyrotechnic inflator. The inflator rapidly produces inflation gas to fill the airbag cushion 102 when activated by a collision sensor system. Airbag cushion 102 also may include one or more closeable vents 107 to enable venting of inflation gas via a closeable vent aperture 106, which may moderate inflation of airbag cushion 102.

Airbag assembly 100 also includes a deployment flap 108 having a first end 109 which is coupled adjacent the airbag cushion 102. In the embodiment depicted in FIG. 1, deployment flap 108 is coupled to airbag cushion 102 adjacent throat 104. In alternative embodiments, the deployment flap 108 may not be attached directly to airbag cushion 102, but may be mounted within the airbag module housing along with the mounting of gas-introducing throat 104. As will be described in greater detail below, deployment flap 108 may function to reinforce the material of airbag cushion 102 and protect airbag cushion 102 from directly impacting the cover of the module housing as the initial inflating sections of airbag cushion 102 force out the cover. The deployment flap 108 may function to protect airbag cushion 102 from ripping, tearing, or otherwise snagging during deployment.

An extension flap 110 is also attached to deployment flap 108 through stitching 112 at a second end 114 of deployment flap 108. Extension flap 110 may be constructed of fabric or similar material and may alternatively be coupled to deployment flap 108 through adhesives, RF welding and the like.

The additional extension flap 110 may increase the likelihood of protecting airbag cushion 102 and help position airbag cushion 102 during deployment due to the location of extension flap 110 relative to airbag cushion 102.

Airbag assembly 100 further comprises a lateral flap 150, which is configured to wrap around airbag assembly 100 when airbag assembly 100 is in a folded, undeployed state and may aid in assuring optimal trajectory of cushion 102 during deployment. Further, lateral flap 150 allows extension flap 110 to deploy in front of cushion 102 without retarding the timing of cushion 102 deployment and allows cushion 102 and extension flap 110 to have separate trajectories. Lateral flap 150 may comprise two ends 152a and 152b, apertures for receiving mounting hardware 154, and a tear seam 156. Lateral flap 150 may comprise a substantial flattened, generally rectangular piece of material such as the woven nylon fabric from which airbag cushion 102 is manufactured and which is well known in the art. Alternatively, lateral flap 150 may comprise a piece of plastic or other material or any suitable piece of fabric with any thickness or shape.

Ends of lateral flap 152a and 152b may comprise substantially semicircular cutout portions 158, which are configured to substantially coincide with throat 104 such that inflation gas in transit via throat 104 is not substantially blocked by lateral flap 150. Mounting apertures 154 are also located at the "ears" formed at ends of semicircular cutouts 158 which are disposed at ends 154. Mounting holes 154 are configured to receive the same mounting hardware that mounts the rest of airbag assembly 100 into the vehicle. Alternatively, mounting holes 154 may not be present, and lateral flap 150 may be coupled to airbag assembly via stitching, gluing, RF welding, or any by other suitable manner. Thus, lateral flap 150 may be attached to the airbag assembly housing, or directly to airbag cushion 102 or deployment flap 108.

Tear seam 156 of lateral flap 150 runs across the short axis of lateral flap 150, approximately parallel with ends 152a and 152b. Alternatively, tear seam 156 may be diagonally oriented across the short axis of lateral flap 150, or may run in a zig-zag, or "Z" pattern across lateral flap 150. Tear seam 156 is configured to rupture when a predetermined magnitude of tension is applied to the seam such that lateral flap 150 does not delay deployment of cushion 102. Tear seam 156 is configured to rupture early in airbag deployment, and is configured to fully rupture, such that lateral flap 150 is completely severed along the tear seam. Tear seam 156 is depicted as large cutouts or perforations, however tear seam 156 may comprise smaller perforations, a reduction in material thickness, a chemical or heat treated area, breakaway stitching, or a release device such as a clip, snap, or button. Although tear seam 156 is herein described and depicted as being in the middle of the long axis of lateral flap 150, in alternative embodiments, tear seam may be located at any suitable location on lateral flap 150. Further, lateral flap 150 may comprise two pieces of material sewn together with breakaway stitching.

Positioned over tear seam 156 is a plurality of folds of the extension flap 110. Note also that extension flap 110 has a width that is less than the width of the folded inflatable airbag cushion. Each of these features assists in the desired movement of the airbag cushion.

Figure 2A:
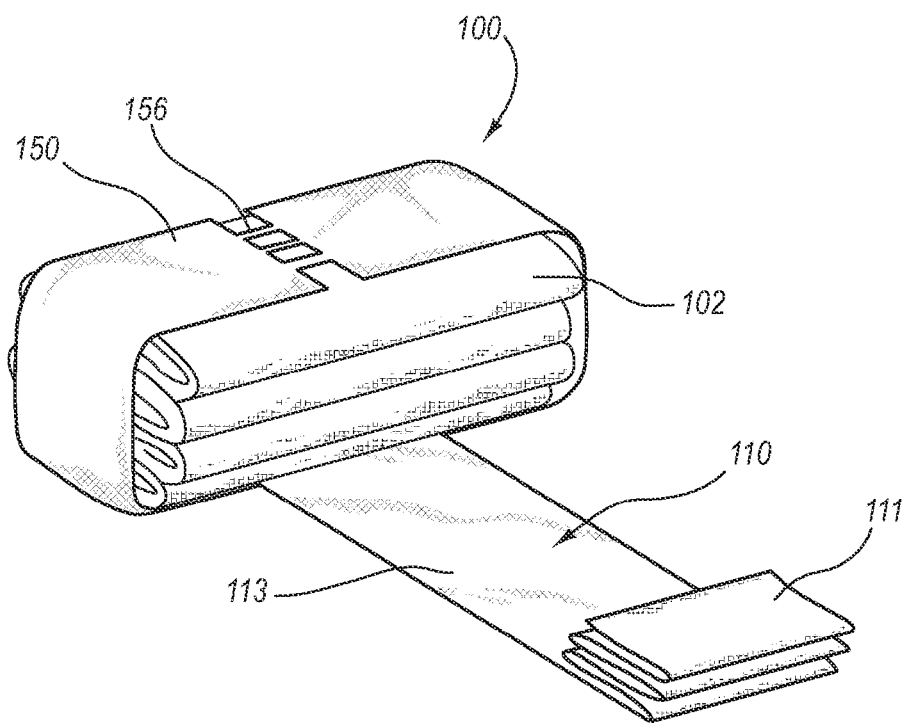
FIG. 2A is a perspective view of the airbag assembly of FIG. 1, wherein the airbag assembly is partially folded.
Figure 2B:
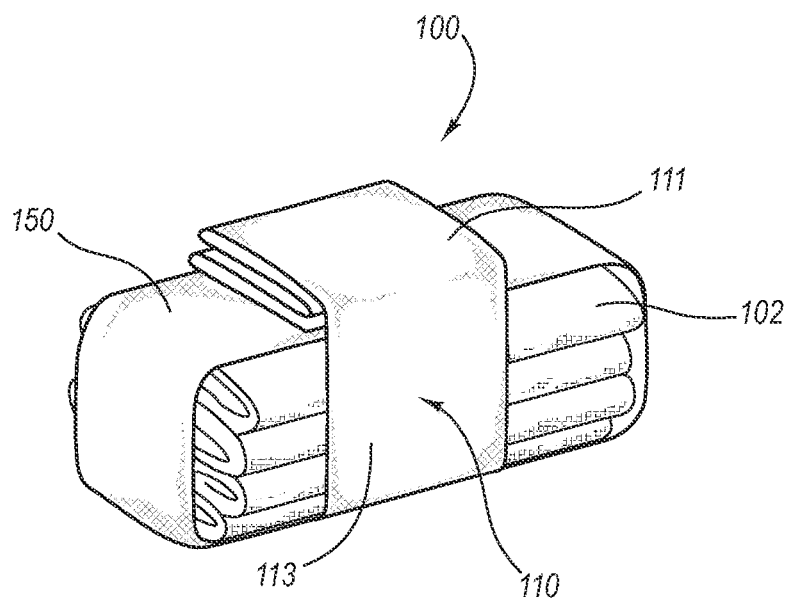
FIG. 2B is a perspective view of the airbag assembly of FIG. 1, wherein the airbag assembly is fully folded.

FIG. 2A and FIG. 2B depict the airbag assembly of FIG. 1 from a perspective view, wherein the airbag assembly is being folded and assembled prior to being installed in a vehicle. Airbag cushion 102 has been folded in a predetermined manner so that it will deploy in a favorable manner.

Extension flap 110 is coupled to cushion 102 via a deployment flap (not shown). A middle portion 113 of extension flap at least partially wraps the folds of airbag cushion 102. Free end 111 of extension flap is folded and during airbag module production will be placed on the folded airbag 102 and lateral flap 150 (as in FIG. 2B).

In FIG. 2A, the free ends 152a and 152b of lateral flap 150 have been securely coupled to the cushion membrane 102 either by attachment to an airbag housing (not shown) or by being directly attached to the bottom surface (according to the view of FIG. 2A) of cushion 102. Lateral flap 150 may tightly wrap cushion 102 along the long (lateral) axis of cushion 102 thereby compressing and retaining cushion 102 in the folded state. Alternatively, lateral flap 150 may loosely wrap cushion 102 such that lateral flap 150 does not compress cushion 102. The length and width of lateral flap 150 may vary depending on the size of cushion 102, and to optimally tune deployment trajectory and characteristics of both cushion 102 and extension flap 110. Tear seam 156 of lateral flap 150 is approximately centered on cushion 102, and runs perpendicular to the long axis of lateral flap 150.

In FIG. 2B, extension flap 110 has been placed on top of lateral flap 150, which in turn, overlies cushion 102, and airbag assembly 100 is now in the configuration that is ready for installation into a vehicle and deployment during a collision event. Extension flap 110 may be retained in this stacked conformation by being attached to lateral flap 150 with a breakaway tack stitch, gluing, welding, a releasable mechanism, the airbag cushion pack being wrapped in a wrapper, or by an airbag housing cover.

Figure 2C:
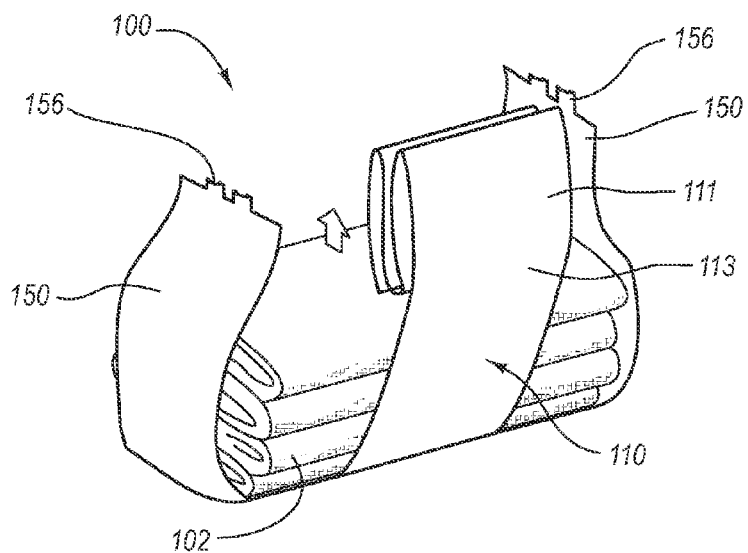
FIG. 2C is a perspective view of the airbag assembly of FIG. 1, wherein the airbag is beginning to be deployed.
Figure 2D:
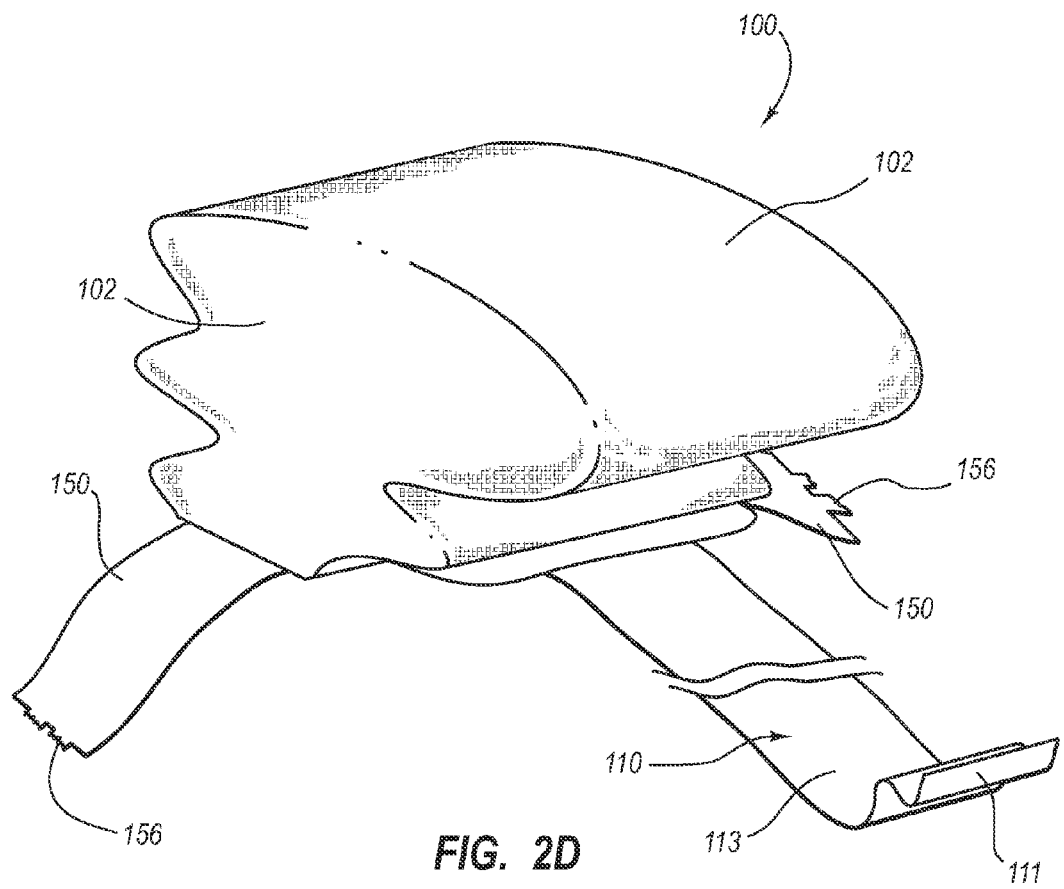
FIG. 2D is a perspective view of the airbag assembly of FIG. 1, wherein the airbag is partially deployed.

FIG. 2C and FIG. 2D are perspective views of the airbag assembly of FIG. 1, wherein the vehicle interior, instrument panel, and airbag housing have been cut away. In the depiction of FIGS. 2C and 2D, airbag assembly 100 is being deployed, with FIG. 2C representing very early deployment and FIG. 2D representing later deployment.

In the depiction of FIG. 2C, airbag assembly has been folded as in the depiction of FIG. 2A and an inflator is just beginning to fill cushion 102 with inflation gas. As cushion 102 expands, tear seam 156 of lateral flap 150 ruptures allowing the further expansion of cushion 102. Lateral flap 150 may aid in determining the trajectory of airbag cushion 102 deployment by separating cushion 102 and extension flap 110, thereby eliminating fabric to fabric contact between these two components and thereby eliminating friction between them allowing each to have independent trajectories. Further, friction between lateral flap 150 and extension flap 110 may tend to pull extension flap 110 laterally in two opposite directions as well as vertically as lateral flap 150 tears across tear seam 156. This may help to provide an optimal trajectory for cushion 102 and may insure that the trajectory of cushion 102 is not altered by extension flap 110 and thus the normal deployment of the cushion is not altered by extension flap 110. In FIG. 2D, the force of expanding cushion 102 has pushed the severed lateral flap 150 off each side of cushion 102, and the halves of lateral flap 150 lie on the instrument panel (not shown). During deployment, cushion 102 and extension flap 110 may tend to travel together, with the distal end of extension flap 110 slightly preceding cushion 102. In the depiction of FIG. 2D, cushion 102 has inflated and since no obstruction was encountered during deployment, extension flap 110 has fallen free and may drape down off of the vehicle instrument panel (not shown).

Figure 3:
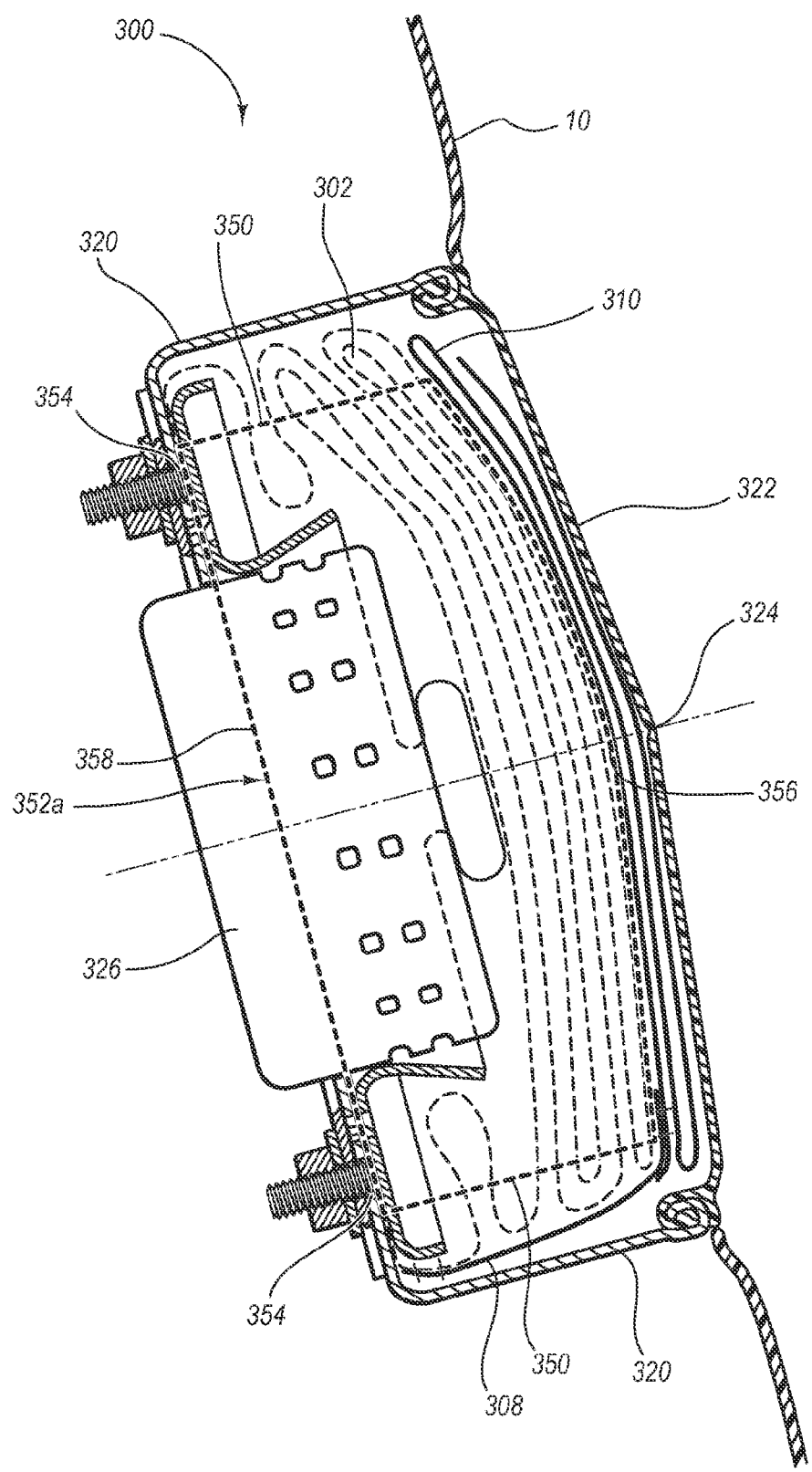
FIG. 3 is a cross sectional side elevation view of an airbag module including one embodiment of an airbag assembly disposed in an instrument panel of a vehicle.

FIG. 3 depicts an airbag module 300, as shown from a side elevation cross sectional view disposed inside an instrument panel 10. Airbag module 300 includes an inflatable airbag cushion 302 disposed within a housing 320. A deployment flap 308 may be attached to or otherwise coupled adjacent airbag cushion 302, while an extension flap 310 is attached to deployment flap 308 through stitching 312. Extension flap 310 is folded between lateral flap 350 and an airbag cover 322.

Housing 320 is typically a rigid member, or may be a fabric soft pack housing. Housing 320 provides a support and mounting structure for airbag module 300 components and 320 may enclose airbag cushion 302, or alternatively may be a mounting plate without side walls. Airbag cover 322 provides a surface that is exposed to the inside of the passenger compartment of a vehicle and also a surface that may open to release airbag cushion 302 upon deployment. Housing 320 and cover 322 form an internal volume, such that airbag module 300 may be situated in several locations within a vehicle, including the steering wheel, the passenger side dash and side doors.

In an undeployed state, deployment flap 308 and extension flap 310 are folded over airbag cushion 302 in an accordion-like fashion, or in alternative embodiments, they may be rolled, folded, or a combination of folds, rolls and accordions. Deployment flap 308 and extension flap 310 protect airbag cushion 302 from directly impacting airbag cover 322 during deployment and further reinforce airbag cushion 302 as the initial inflating sections of airbag cushion 302 force out airbag cover 322 through one or more tear seams 324. Tear seams 324 are generally sections of airbag cover 322 that have a reduced thickness compared to other portions of airbag cover 322. Tear seams 324 provide controlled failure locations in airbag cover 322 through which a deploying airbag may pass.

Lateral flap 350 at least partially wraps around folded airbag cushion 302 on four sides and is disposed between cushion 302 and extension flap 310. End 352 is coupled to airbag assembly 300 via mounting apertures 354 and may be bolted to housing 320. Semicircular cutout portion 358 partially circumnavigates inflator 326 and may coincide with a gas-receiving throat of airbag cushion 302. Tear seam 356 is approximately centered on airbag assembly 300 and in the view of FIG. 3, runs from the top to the bottom of lateral flap 350.

Deployment of airbag cushion 302 occurs as an inflator 326 generates inflation gas, which is directed into airbag cushion 302. As airbag cushion 302 inflates, it applies a force on both airbag cover 322 and the expanding airbag cushion 302 forces through airbag cover 322 into the passenger compartment.

If edges of tear seams 324 are not completely smooth when torn open, the edges may cause tears or rips on the fabric of conventional airbag systems. However, according to the embodiment of FIG. 3, deployment flap 308 and extension flap 310 are configured to reinforce the airbag material as airbag cushion 302 exits airbag cover 322 during deployment. Extension flap 310 is also configured to deploy in front of airbag cushion 302 so that extension flap 310 deploys between airbag cushion 302 and a potential out-of-position object. Because deployment, extension, and lateral flaps 308, 310, 350 are situated between airbag cushion 302 and airbag cover 302, the interaction with any potentially rough edges will occur with flaps 308, 310, 350, and not airbag cushion 302. This configuration prevents holes, tears or snags from forming in airbag cushion 302.

Figure 4:
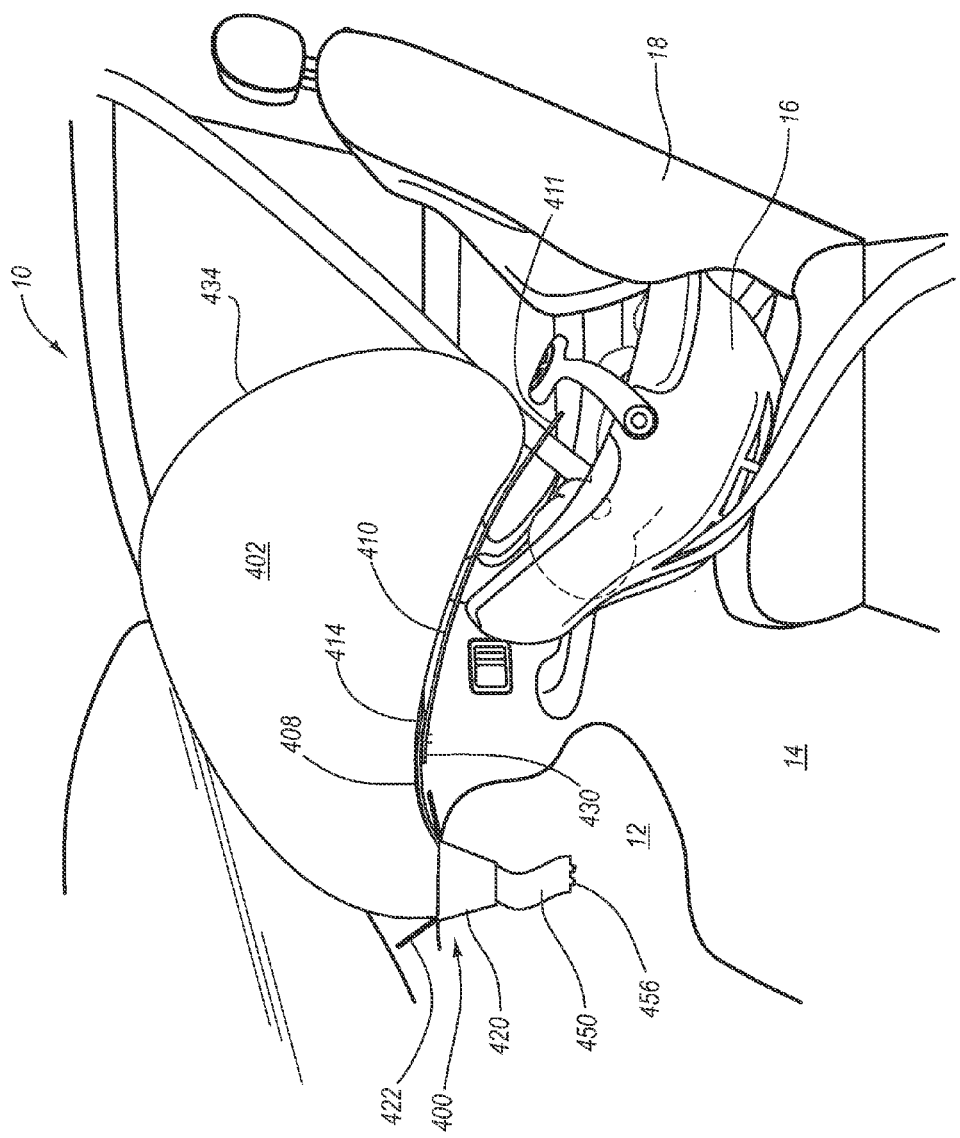
FIG. 4 is a perspective view from inside a vehicle of one embodiment of a passenger-side airbag assembly in a deployed state.

FIG. 4 illustrates one embodiment of a passenger-side airbag assembly 400 in a deployed state, as shown from a perspective view within a passenger compartment 14 of a vehicle 10. An inflatable airbag cushion 402 is shown after it has deployed through an airbag cover 422 from an airbag module housing 420 disposed in an instrument panel 12.

A deployment flap 408 similar to those described herein extends from module housing 420. A first end (not shown) of deployment flap 408 is coupled to or adjacent to the airbag within module housing 420. A second end 414 of deployment flap 408 is attached to a first end 430 of an extension flap 410, through stitching or similar fastening methods. A second or free end 411 of extension flap 410 extends into the passenger compartment 14 and around an out of position object, such as an infant car seat 16 located in the passenger seat 18. In the embodiment shown, second end 411 of extension flap 410 extends beyond a distal end 434 of inflatable airbag cushion 402 when inflated.

In addition to providing protection to airbag cushion 402 as it deploys out of module housing 420, extension flap 410 also functions to position the airbag around out of position objects such as the car seat 16 or an out of position occupant. By guiding the deployment of airbag cushion 402 around problematic objects, extension flap 410 helps airbag cushion 402 to not deploy in an anomalous condition. Airbag cushion 402 is thereby allowed to deploy in a normal state and reduce the potential of injury to occupants by anomalous deployment.

In the view of FIG. 4, lateral flap 450 has been torn at tear seam 456 by the force of expanding airbag cushion 402. Due to lateral flap 450 separating cushion 402 and extension flap 410, the deployment trajectories of lateral flap 450 and extension flap 410 are independent. Thus, neither the deployment trajectory nor timing of deployment of cushion 402 were altered or retarded.

FIGS. 5A through 5D represent another embodiment of an airbag assembly 500 deploying from the instrument panel 10, as shown from a cross sectional side elevation view. Airbag assembly 500 includes an airbag cushion 502 which includes a closeable vent 540, such as a cinch tube, an extension flap 510, and a lateral flap 550.

Extension flap 510 is integrated with a fabric of the deployment flap, such that a single extended piece of fabric deploys with airbag cushion 502. Lateral flap may comprise a single piece of material that wraps the folded, undeployed cushion 502, and lies between cushion 502 and extension flap 510 when airbag assembly 500 is in a folded, undeployed state.

An airbag cover 522 lies over airbag assembly 500, and cushion 502, deployment flap 508, extension flap 510, and lateral flap 550 are arranged in a manner similar to that depicted in FIG. 3. Upon a signal from vehicle sensors, an inflator 526 rapidly generates or releases inflation gas into cushion 502, which causes the expansion of cushion 502 and the breakthrough of cushion 502 through cover 522.

As cushion 502 expands, pressure is put on tear seam 556 of lateral flap 550 until the seam ruptures and lateral flap 550 is torn into two pieces, which allows cushion 502 to expand without impediment. The separation of extension flap 510 and cushion 502 by lateral flap 550 assures that extension flap 510 deploys independently from cushion 502 without altering the trajectory or time required for full deployment of cushion 502.

Closeable vent 540 may comprise a membrane 507 which comprises a cinch tube constructed of a nylon woven fabric-type or suitable material known in the art. The closeable vent 540 may be embodied with a generally cylindrical shape and having open ends to enable gas venting. Closeable vent 540 may alternatively be of any suitable shape such as a polygonal shape. Closeable vent 540 may also be embodied with a height that is sufficient to achieve desired closure.

Closeable vent 540 is coupled to the surface of airbag cushion 502 and circumvents an aperture 506. In one embodiment, closeable vent 540 may extend into the airbag cushion interior, or in other embodiments, closeable vent 540 may extend outside airbag cushion 502. In one embodiment, a single closeable vent 540 may be used, but airbag cushion 502 may include multiple closeable vents, which may optionally be symmetrically disposed in airbag cushion 502 as shown in FIGS. 5A through 5D, to provide additional venting capability.

Airbag assembly 500 includes a tether 542 that couples or engages closeable vent 540 and couples to a surface of airbag cushion 502. Tether 542 may be constructed of a nylon material or other suitable material known in the art. The surface to which tether 542 is connected may be the surface opposing the outer surface that is configured to contact the occupant. The location of where tether 542 is coupled to may depend on module deployment angle, vehicle interior geometry and cushion fold type.

Figure 5A:
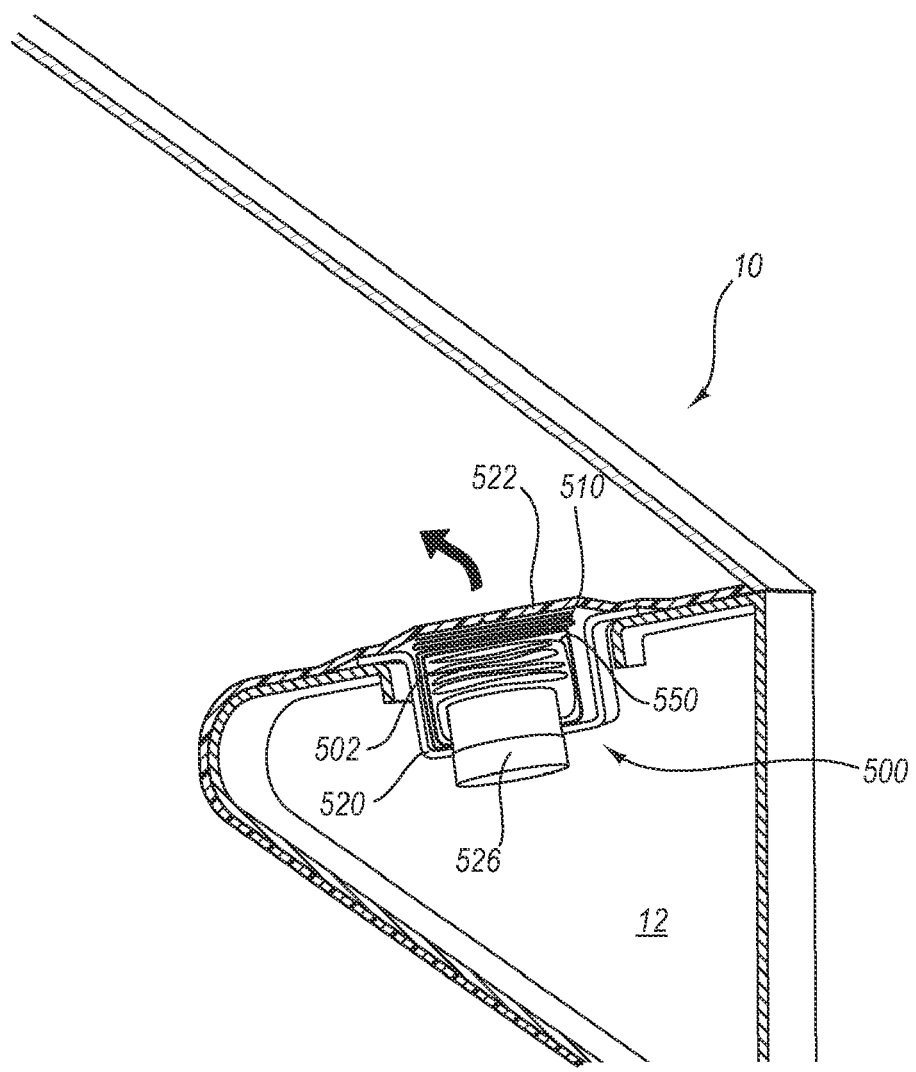
FIG. 5A is a cross sectional side elevation view illustrating an airbag assembly prior to deployment.
Figure 5B:
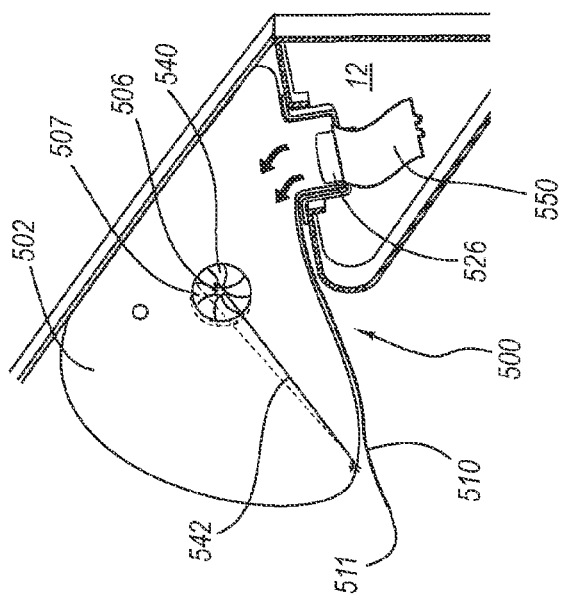
FIG. 5B is a cross sectional side elevation view illustrating the airbag assembly of FIG. 5A during initial deployment.

In FIG. 5B, the initially deploying airbag cushion 502 has a slack tether 542 and closeable vent 540 remains open. Extension flap 510 deploys in front of deploying cushion 502. The tear seam 556 of lateral flap 550 has completely ruptured, resulting in lateral flap 550 being torn into two pieces. Since each end of lateral flap 550 is still coupled to housing 520, lateral flap 510 is not torn free of airbag assembly 500.

Figure 5C:
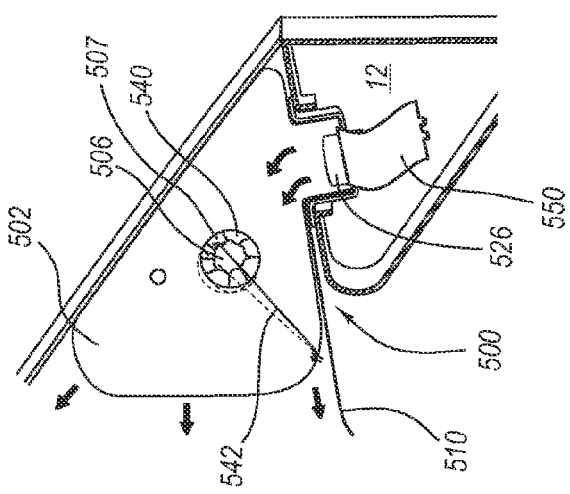
FIG. 5C is a cross sectional side elevation view illustrating the deploying airbag cushion of FIG. 5A at a later stage of deployment.
Figure 5D:
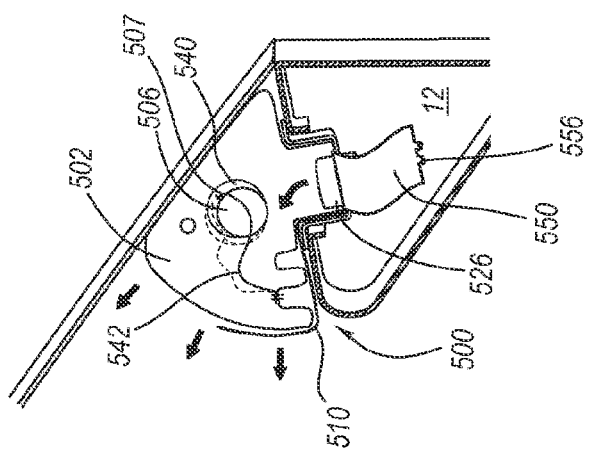
FIG. 5D is a cross sectional side elevation view illustrating the airbag cushion of FIG. 5A in a deployed state.

In FIG. 5C, tether 542 is pulled taut and closeable vent 540 begins to close. Extension flap 510 not only helps position airbag cushion 502 around potential out-of-position objects; it also helps ensure proper operation of closeable vent 540. In FIG. 5D, tether 542 is completely taut and closeable vent 540 is closed. Extension flap 510 may extend to adjacent the distal end of airbag cushion 502. Alternatively, and as described above, extension flap 510 may extend beyond the distal end of airbag cushion 502.

If an occupant or another object is in close proximity to deploying airbag 502 and restricts normal inflation, closeable vent 540 remains open and allows gas to rapidly escape from aperture 506 of closeable vent 540 because tether 542 is slack. However, if the occupant is in a normal position and inflation is unrestricted, the tension of tether 542 pulls on closeable vent 540 to close closeable vent 540. Closure retains inflation gas for normal occupant restraint. Thus, closeable vent 540 and extension flap 510 may be used as a variable feature in out-of-position conditions and in normal restraint conditions. In this manner, airbag cushion 502 is sensitive to obstructive expansion of cushion 502.

Although FIGS. 5A-D depict a cinch tube type closeable vent, virtually any closeable vent may be configured to be used in combination with extension flap 510 and lateral flap 550. Other types of vents that may be used include vents that are initially deployed in a closed conformation, become open during the course of normal deployment and remain open if the airbag encounters an obstruction, and then close again if the airbag deploys without obstruction.

Deployment flaps 108, 308, 408, 508 disclosed herein are examples of means for protecting the airbag cushion during deployment from an airbag module housing. Moreover, extension flaps 110, 310, 410, 510, disclosed herein are examples of means for positioning the airbag cushion during deployment. Furthermore, lateral flaps 150, 350, 450, 550, disclosed herein are examples of means separating an airbag cushion and an extension flap. Additionally, closeable vents 540 disclosed herein are examples of means for restricting gas venting.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly, comprising:
an inflatable airbag cushion in a folded configuration comprising a plurality of folds and a top surface that is directed towards a cover when the inflatable airbag cushion is deployed;
an extension flap,
wherein the extension flap comprises a free end and an attached end that are opposite from each other,
wherein the extension flap is at least partially wrapped around the inflatable airbag cushion before deployment of the inflatable airbag cushion,
wherein the extension flap is configured to protect the inflatable airbag cushion during deployment,
wherein the extension flap is positioned such that, during deployment, the attached end remains attached at a location that enables the extension flap to be positioned below the inflatable airbag cushion in a passenger compartment of a vehicle during deployment,
wherein the extension flap is configured such that the free end is unattached before deployment of the inflatable airbag cushion and remains unattached during deployment of the inflatable airbag cushion,
wherein the extension flap is configured not to rupture during deployment; and,
a lateral flap coupled adjacent to the inflatable airbag cushion and, in the undeployed state, at least partially wrapped around the folded inflatable airbag cushion but not the extension flap,
wherein, in the undeployed state, the free end of the extension flap and a plurality of folds of the extension flap are positioned over the top surface of the folded inflatable airbag cushion and over a portion of the lateral flap that is configured to rupture such that the portion of the lateral flap that is configured to rupture is disposed between the top surface of the folded inflatable airbag cushion and the plurality of folds of the extension flap,
wherein the airbag cushion, the extension flap and the lateral flap are positioned and configured such that, during inflatable airbag cushion deployment, the extension flap does not retard the timing for full deployment of the inflatable airbag cushion, and
whereby, during deployment of the inflatable airbag cushion, the extension flap deploys in front of the inflatable airbag cushion due to the position of the free end of the extension flap and the folds of the extension flap, in the undeployed state, over a portion of the lateral flap that is configured to rupture and over the top surface of the folded inflatable airbag cushion.

2. The airbag assembly of claim 1, further comprising a deployment flap coupled adjacent to the inflatable airbag cushion, wherein the deployment flap is configured to protect the inflatable airbag cushion as it deploys out of an airbag module housing.

3. The airbag assembly of claim 2, wherein the extension flap is attached to the deployment flap.

4. An airbag assembly, comprising:
an inflatable airbag cushion in a folded configuration, comprising a plurality of folds and a top surface that is directed towards a cover when the inflatable airbag cushion is deployed, wherein the inflatable airbag cushion is configured for frontal deployment with distal end, a bottom surface and an opposing top surface, wherein the top surface is closer to a windshield of a vehicle when the inflatable airbag cushion is deployed than the bottom surface;
an extension flap,
wherein the extension flap comprises a free end and an attached end that are opposite from each other,
wherein the extension flap is at least partially wrapped around the inflatable airbag cushion before deployment of the inflatable airbag cushion,
wherein the extension flap is configured to protect the inflatable airbag cushion during deployment,
wherein the extension flap is positioned such that, during deployment, the attached end remains attached at a location that enables the extension flap to be positioned below the bottom surface of the inflatable airbag cushion in a passenger compartment of a vehicle during deployment,
wherein the extension flap is configured such that the free end is unattached before deployment of the inflatable airbag cushion and remains unattached during deployment of the inflatable airbag cushion,
wherein the extension flap is configured not to rupture during deployment; and,
a lateral flap coupled adjacent to the inflatable airbag cushion and, in the undeployed state, at least partially wrapped around the folded inflatable airbag cushion but not the extension flap,
wherein, in the undeployed state, the free end of the extension flap and a plurality of folds of the extension flap are positioned over the top surface of the folded inflatable airbag cushion and over a portion of the lateral flap that is configured to rupture such that the portion of the lateral flap that is configured to rupture is disposed between the top surface of the folded inflatable airbag cushion and the plurality of folds of the extension flap,
wherein the portion of the lateral flap that is configured to rupture is oriented such that rupturing occurs perpendicular to the folds of the extension flap,
wherein the airbag cushion, the extension flap and the lateral flap are positioned and configured such that, during inflatable airbag cushion deployment, the extension flap does not retard the timing for full deployment of the inflatable airbag cushion, and
whereby, during deployment of the inflatable airbag cushion, the free end of the extension flap deploys in front of the inflatable airbag cushion due to the position of the free end of the extension flap, in the undeployed state, over a portion of the lateral flap that is configured to rupture and over the top surface of the folded inflatable airbag cushion.

5. The airbag assembly of claim 4, wherein the extension flap has a width that is less than the width of the folded inflatable airbag cushion.

6. The airbag assembly of claim 4, further comprising a deployment flap coupled adjacent to the inflatable airbag cushion, wherein the deployment flap is configured to protect the inflatable airbag cushion as it deploys out of an airbag module housing.

7. The airbag assembly of claim 6, wherein the extension flap is attached to the deployment flap.

8. An airbag assembly, comprising:
- an inflatable airbag cushion in a folded configuration, comprising a plurality of folds and a top surface that is directed towards a cover when the inflatable airbag cushion is deployed, wherein the inflatable airbag cushion is configured for frontal deployment with a distal end, a bottom surface and an opposing top surface, wherein the top surface is closer to a windshield of a vehicle when the inflatable airbag cushion is deployed than the bottom surface;
- an extension flap,
  - wherein the extension flap comprises a free end and an attached end that are opposite from each other,
  - wherein the extension flap is at least partially wrapped around the inflatable airbag cushion before deployment of the inflatable airbag cushion,
  - wherein the extension flap is configured to protect the inflatable airbag cushion during deployment,
  - wherein the extension flap is positioned such that, during deployment, the attached end remains attached at a location that enables the extension flap to be positioned below the bottom surface of the inflatable airbag cushion in a passenger compartment of a vehicle during deployment,
  - wherein the extension flap is configured such that the free end is unattached before deployment of the inflatable airbag cushion and remains unattached during deployment of the inflatable airbag cushion,
  - wherein the length between the attached end and the free end enables the free end to extend beyond the distal end of the inflatable airbag cushion upon full deployment of the inflatable airbag cushion, and,
  - wherein the extension flap is configured not to rupture during deployment;
- a lateral flap coupled adjacent to the folded inflatable airbag cushion and configured to separate the inflatable airbag cushion and the extension flap when the inflatable airbag cushion is in an undeployed state,
  - wherein, in the undeployed state, the lateral flap at least partially wraps around the folded inflatable airbag cushion but not the extension flap,
  - wherein, in the undeployed state, the free end of the extension flap and a plurality of folds of the extension flap are positioned over the top surface of the folded inflatable airbag cushion and over a portion of the lateral flap that is configured to rupture such that the portion of the lateral flap that is configured to rupture is disposed between the top surface of the folded inflatable airbag cushion and the plurality of folds of the extension flap,
  - wherein the airbag cushion, the extension flap and the lateral flap are positioned and configured such that, during inflatable airbag cushion deployment, the extension flap does not retard the timing for full deployment of the inflatable airbag cushion, and
  - whereby, during deployment of the inflatable airbag cushion, the free end of the extension flap deploys in front of the inflatable airbag cushion due to the position of the free end of the extension flap and the folds of the extension flap, in the undeployed state, over a portion of the lateral flap that is configured to rupture and over the top surface of the folded inflatable airbag cushion.

9. The airbag assembly of claim 8, wherein the portion of the lateral flap that is configured to rupture is oriented such that rupturing occurs perpendicular to the folds of the extension flap.

10. The airbag assembly of claim 8, wherein the extension flap is of such a width that it does not fully cover any surface of the inflatable airbag cushion.

11. The airbag assembly of claim 8, wherein the lateral flap is of such a width that it does not fully cover any surface of the folded inflatable airbag cushion.

12. The airbag assembly of claim 8, wherein the portion of the lateral flap that is configured to rupture comprises at least one tear seam disposed within the fabric of the lateral flap.

13. The airbag assembly of claim 12, wherein the lateral flap has a rectangular shape and the tear seam runs parallel with the short axis of the lateral flap.

14. The airbag assembly of claim 12, wherein the tear seam comprises perforations in the fabric of the lateral flap.

15. The airbag assembly of claim 12, wherein the at least one tear seam is configured to fully rupture when a predetermined magnitude of stress is applied to the tear seam by the deploying inflatable airbag cushion such that the pieces of fabric on each side of the tear seam are completely separated and move out of the airbag deployment path.

16. The airbag assembly of claim 8, wherein the lateral flap comprises two semi-circular shaped ends defining the termini of the long axis of the lateral flap, the semi-circular ends configured to surround a gas-introducing throat of the inflatable airbag cushion, such that gas may enter the inflatable airbag cushion unimpeded by the lateral flap, the semi-circular shaped ends also comprising mounting tabs with apertures for receiving mounting hardware.

* * * * *